UNITED STATES PATENT OFFICE.

ROBERT MILTON PERRINE, OF CLEVELAND, OHIO.

PROCESS OF PURIFYING AND DEODORIZING CRUDE PETROLEUM.

SPECIFICATION forming part of Letters Patent No. 419,347, dated January 14, 1890.

Application filed November 17, 1886. Serial No. 219,187. (Specimens.)

*To all whom it may concern:*

Be it known that I, ROBERT MILTON PERRINE, a citizen of the United States, residing at Cleveland, in the county of Cuyahoga and State of Ohio, have invented certain new and useful Improvements in Process of Purifying and Deodorizing Crude Petroleum; and I hereby declare that the following is a full, clear, and exact description of the invention, such as will enable others skilled in the art to which it appertains to make and use the same.

The object of my invention is to remove from crude petroleum its peculiar and offensive odor and clarify the oil by removing its impurities; and my invention is especially applicable to oil produced in the so-called "Lima oil field," and known as "Lima oil," which is in its crude state possessed of a peculiar and repulsive odor, more pronounced than that of ordinary crude petroleum, and which odor is only partially removed by the ordinary processes of refining and purifying petroleum-oil, but is by my invention so completely eliminated that no trace of it is apparent in the finished and refined oil. By the term "crude petroleum" I designate the oil in the condition in which it is obtained from the wells without any other purification than the settling out of sand, &c.

I am aware that deodorizing processes have been applied to refined petroleum-oil designed for illuminating purposes, and that acids and alkalies, usually soda or potash, have been used for that purpose; but in consequence of the tendency and liability of the products of the fractional distillation of petroleum to "crack" in the distillation, by which the odor natural to such products is fixed more or less completely and perfect deodorization rendered almost impossible, I apply my deodorizing process to the crude oil before it is subjected to refining or distillation.

To carry my invention into effect, I place the crude petroleum to be operated upon in an agitating-tank of the common form, or in any tank in which it can be agitated, either by blowing currents of air through it or stirring it by mechanical means. The oil may be treated at natural temperatures or slightly warmed to a temperature not so high as to drive off any of the lighter volatile constituents of the oil—such as gasoline or lighter hydrocarbons—if it is desired to preserve those products. By warming the oil during the treatment a smaller quantity of the deodorizing materials is required and the time of treatment is somewhat lessened. If the oil is to be treated without warming, to the crude oil in the tank I add chloride of lime, in powder, in the proportion of five ounces of the powder to each gallon of oil, and agitate the mass at ordinary temperature for five hours, so as to insure a thorough mixture and contact of every part of the oil with the chloride of lime. At the end of five hours concentrated sulphuric acid is added to the mixture in the proportion of one pint of the acid to each three hundred or three hundred and twenty gallons of the oil, and the agitation is continued for at least one-half hour longer to thoroughly act upon every part of the mixture and neutralize any free alkali which may be present. The acid may advantageously be mixed with hot water in the proportion of one gallon of water to each pint of acid before being added to the oil, which will tend to prevent burning or spurting. The mixture is then allowed to stand for from three to five hours, during which time the gases liberated from the oil and combined with the chlorine gas will escape and the acid and neutralized lime salts will subside, carrying to the bottom all the impurities of the oil, and the oil will be found to be deprived of its offensive odor and to be freed of all impurities which may have been present in it. If the oil is to be warmed, a tank or agitator provided with a jacket or coil for heating by the use of steam is used, and the oil is warmed to any desired degree short of volatilizing such of its lighter constituents as it is desired to save. It may safely be warmed to 250° Fahrenheit without material loss by volatilization, and at this temperature two pounds of the dry chloride of lime, in powder, to each fifty gallons of oil will be sufficient, the quantity of chloride of lime used increasing as the temperature is lower. Three hours' agitation will suffice at the temperature named, (250° Fahrenheit,) when the sulphuric acid in proportion of one pint in a gallon of water to each fifty barrels of oil is to be added, the agitation continued for half an hour, and the oil left to settle. It is convenient, although not necessary, to introduce a small quantity of water when the oil is left to settle, into which the impurities settle, and the separation of the purified oil is facilitated. When the settling is complete—say at the end of about five hours—the deodorized and purified crude oil may be pumped out or drawn off by any suitable means, after which it may be subjected to any of the usual refining processes for the production of illuminating-oil, and will produce a completely-deodorized illuminating-oil without resort to the usual processes for deodorizing refined oil.

In defining my invention with greater clearness, I would state that I am aware of the patent to Tatro, No. 106,233, dated August 9, 1870, in which the same reagents are used that I employ. That process, however, is designed to act upon distilled or refined oils, and not upon crude petroleum. Its object is to raise the fire-test, and not to deodorize or purify the oil, and its steps are to first add the sulphuric acid and in five to ten minutes after the chloride of lime, in contradistinction to my order of procedure, in which I first add the chloride of lime, and after agitating for five hours then add the sulphuric acid. My process differs in the material acted upon, the end sought, and the *modus operandi*, it being important for the purposes of deodorizing the crude oil that the chloride of lime should permeate every particle of the oil, and the action of the chlorine of the chloride of lime should first take effect upon the bad odors by decomposing their constituent elements, (and which action requires some considerable time,) the sulphuric acid being added subsequently to complete the elimination of chlorine gas in intimate association with every particle of oil and to remove the lime and other impurities. If the acid were added first and the chloride of lime in quick succession afterward, it is obvious that there would be an interference in the action of the two reagents, due to the liberation of chlorine gas before it had reached the ultimate particles of the oil, which would defeat the end of the process sought by me as applied to crude petroleum. While I therefore make no broad claim upon the use of these ingredients in refining oils, I am not aware that my process in the order of the steps described has ever been applied to crude petroleum for the purposes of my invention.

Having thus described my invention, what I claim as new is—

The process herein described of deodorizing and purifying crude petroleum-oils, which consists in first agitating or stirring the same with chloride of lime for a period of five hours, more or less, and then adding sulphuric acid to complete the elimination of chlorine gas, and to neutralize and precipitate the alkaline matters and other impurities, and finally drawing off or removing the purified and deodorized oil, substantially as herein described.

ROBERT MILTON PERRINE.

Witnesses:
L. PRENTISS,
E. C. VORCE.